United States Patent
Kikuchi et al.

(10) Patent No.: US 10,766,400 B2
(45) Date of Patent: Sep. 8, 2020

(54) VEHICLE LAMP AND LIGHTING CIRCUIT OF LIGHT SOURCE

(71) Applicant: KOITO MANUFACTURING CO., LTD., Tokyo (JP)

(72) Inventors: Satoshi Kikuchi, Shizuoka (JP); Tomoyuki Ichikawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/991,636

(22) Filed: May 29, 2018

(65) Prior Publication Data

US 2018/0339642 A1 Nov. 29, 2018

(30) Foreign Application Priority Data

May 26, 2017 (JP) .................................. 2017-104923

(51) Int. Cl.
| | |
|---|---|
| *B60Q 1/04* | (2006.01) |
| *F21S 41/141* | (2018.01) |
| *B60Q 1/14* | (2006.01) |
| *H05B 45/14* | (2020.01) |
| *F21S 41/32* | (2018.01) |

(Continued)

(52) U.S. Cl.
CPC .............. *B60Q 1/04* (2013.01); *B60Q 1/143* (2013.01); *F21S 41/141* (2018.01); *F21S 41/148* (2018.01); *F21S 41/153* (2018.01); *F21S 41/19* (2018.01); *F21S 41/255* (2018.01); *F21S 41/32* (2018.01); *F21S 41/39* (2018.01); *F21S 41/663* (2018.01); *F21S 41/675* (2018.01);

(Continued)

(58) Field of Classification Search
CPC ...... B60Q 1/04; F21S 41/141; H05B 37/0209
See application file for complete search history.

(56) References Cited

U.S. PATENT DOCUMENTS 9,878,656 B2 * 1/2018 Gergets ................ B60Q 1/2611
2006/0170379 A1 * 8/2006 Uchida .................. H05B 35/00
315/312

(Continued)

FOREIGN PATENT DOCUMENTS

| CN | 101247687 A | 8/2008 |
|---|---|---|
| CN | 102625522 A | 8/2012 |

(Continued)

OTHER PUBLICATIONS

Office Action issued in corresponding Chinese Application No. 201810516444.9; dated Oct. 31, 2019 (16 pages).

*Primary Examiner* — Amy Cohen Johnson
*Assistant Examiner* — Syed M Kaiser
(74) *Attorney, Agent, or Firm* — Osha Liang LLP (57) ABSTRACT

A lighting circuit is configured to drive a light source including a plurality of light emitting elements connected in series. The lighting circuit includes a plurality of bypass switches respectively connected in parallel to the light emitting elements, a switching converter, and a converter controller configured to (i) stabilize a lamp current generated by the switching converter to a first target amount in a lighting-on state where at least one of the plurality of light emitting elements is turned on, and to (ii) stabilize the lamp current to a second target amount smaller than the first target amount in a complete lighting-off state where all of the plurality of light emitting elements are turned off.

9 Claims, 10 Drawing Sheets

(51) Int. Cl.
*F21S 41/153* (2018.01)
*F21S 41/39* (2018.01)
*F21S 41/148* (2018.01)
*F21S 41/663* (2018.01)
*F21S 41/255* (2018.01)
*F21S 41/19* (2018.01)
*F21S 41/675* (2018.01)
*H05B 45/48* (2020.01)
*H05B 47/10* (2020.01)
*F21W 102/14* (2018.01)

(52) U.S. Cl.
CPC ............ *H05B 45/14* (2020.01); *H05B 45/48* (2020.01); *H05B 47/10* (2020.01); *F21W 2102/14* (2018.01)

(56) References Cited

U.S. PATENT DOCUMENTS

| | | | |
|---|---|---|---|
| 2008/0197789 A1 | 8/2008 | Shiotsu et al. | |
| 2011/0025209 A1* | 2/2011 | Nakanishi | B60Q 1/12 315/82 |
| 2012/0194088 A1 | 8/2012 | Pan | |
| 2013/0181630 A1* | 7/2013 | Taipale | H05B 37/0263 315/224 |
| 2014/0146175 A1* | 5/2014 | Jeon | B60Q 1/085 348/148 |
| 2014/0265890 A1 | 9/2014 | Ito et al. | |
| 2015/0069909 A1* | 3/2015 | Suganuma | H05B 33/089 315/82 |
| 2015/0158414 A1* | 6/2015 | Ohta | B60O 1/00 315/77 |
| 2015/0230302 A1* | 8/2015 | Ito | H05B 33/0815 315/77 |
| 2015/0257225 A1 | 9/2015 | Yu et al. | |
| 2016/0096467 A1* | 4/2016 | Murakami | H05B 33/0815 315/82 |
| 2017/0034887 A1* | 2/2017 | Ichikawa | B60Q 1/04 |
| 2017/0047774 A1* | 2/2017 | Rezeanu | H02J 7/047 |
| 2017/0113599 A1* | 4/2017 | Park | F21S 41/36 |
| 2017/0182941 A1* | 6/2017 | Ohta | B60Q 1/38 |
| 2017/0334337 A1* | 11/2017 | Ohno | F21S 41/16 |
| 2017/0359869 A1* | 12/2017 | Ohta | B60Q 1/34 |
| 2018/0003357 A1* | 1/2018 | Park | F21S 41/16 |
| 2018/0098393 A1* | 4/2018 | Matsumoto | H05B 33/083 |
| 2018/0339642 A1* | 11/2018 | Kikuchi | B60Q 1/04 |

FOREIGN PATENT DOCUMENTS

| | | |
|---|---|---|
| CN | 104902614 A | 9/2015 |
| JP | 2014-180099 A | 9/2014 |
| JP | 6235367 B2 | 11/2017 |

* cited by examiner

VEHICLE LAMP AND LIGHTING CIRCUIT OF LIGHT SOURCE

CROSS-REFERENCE TO RELATED APPLICATIONS

The present application claims the benefit of priority of Japanese Patent Application No. 2017-104923, filed on May 26, 2017, the content of which is incorporated herein by reference.

TECHNICAL FIELD

Aspects of the present invention relate to a lighting circuit of a semiconductor light source.

BACKGROUND

A vehicle lamp can generally switch between a low beam and a high beam. The low beam provides a predetermined illumination for a nearby area and has light distribution designed to not give glare to an oncoming vehicle or a preceding vehicle, so that the low beam is mainly used when travelling in urban areas. The high beam provides a bright illumination for a front wide and distant area and is mainly used when travelling at high speed on a road with few oncoming vehicles or preceding vehicles. Therefore, although the high beam gives better visibility to a driver than the low beam, the high beam would give glare to a driver of a preceding vehicle or a pedestrian at a front side of the vehicle.

In recent years, there has been proposed Adaptive Driving Beam (ADB) technique which controls a light distribution pattern of a high beam dynamically and adaptively based on conditions surrounding the vehicle. The ADB technique reduces glare to a vehicle or a pedestrian by detecting presence of a preceding vehicle, an oncoming vehicle or a pedestrian at a front side of the vehicle and reducing or turning off lights for an area corresponding to the detected vehicle or pedestrian.

Figure 1:
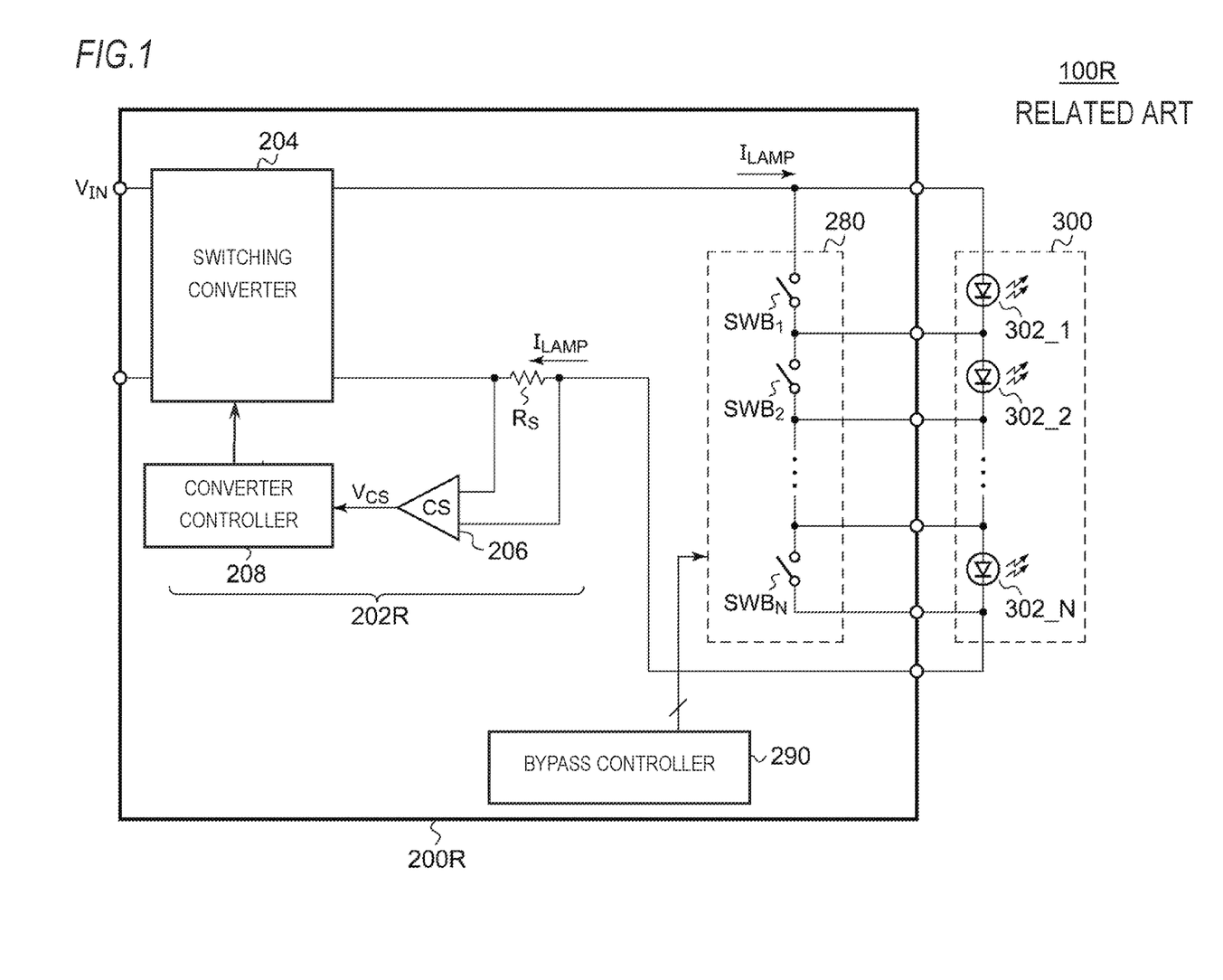
FIG. 1 is a circuit block diagram of a vehicle lamp studied by the inventors.

FIG. 1 is a circuit block diagram of a vehicle lamp 100R studied by the inventors of the present application. The vehicle lamp 100R includes a lighting circuit 200R and a light source 300.

The light source 300 includes a plurality of (N; N≥2) light emitting elements 302_1 to 302_N. The lighting circuit 200R is configured to independently control turning-on/off of the light source 300 by a bypass method. The lighting circuit 200R includes a constant current circuit 202R, a bypass circuit 280, and a bypass controller 290.

The constant current circuit 202R generates a drive current (lamp current) $I_{LAMP}$ stabilized at a target value. The bypass circuit 280 includes a plurality of bypass switches $SWB_1$ to $SWB_N$. A bypass switch $SWB_i$ (1≤i≤N) is provided between both ends of a corresponding light emitting element 302_i. The bypass controller 290 controls on/off of the plurality of bypass switches $SWB_1$ to $SWB_N$ individually so as to obtain a desired light distribution pattern. When an i-th bypass switch $SWB_i$ is turned off, the lamp current $I_{LAMP}$ flows into the light emitting element 302_i, and accordingly, the light emitting element 302_i becomes a lighting-on state. When the i-th bypass switch $SWB_i$ is turned on, since the lamp current $I_{LAMP}$ flows through the bypass switch $SWB_i$ and no current flows into the light emitting element 302_i, the light emitting element 302_i becomes a lighting-off state.

The constant current circuit 202R includes a switching converter 204, a sense resistor $R_S$, a current detection circuit 206, and a converter controller 208.

The sense resistor $R_S$ is provided on a path of the lamp current $I_{LAMP}$, and a voltage drop proportional to the lamp current $I_{LAMP}$ is generated between both ends of the sense resistor $R_S$. The current detection circuit 206 generates a current detection signal $V_{CS}$ based on the voltage drop of the sense resistor $R_S$.

The switching converter 204 is a buck converter or a boost converter. The converter controller 208 controls the switching converter 204 such that the detection signal $V_{CS}$ approaches a reference voltage $V_{REF}$ corresponding to the target value of the lamp current. For example, JP-A-2014-180099 discloses a lighting control device.

The inventors of the present application have recognized the following problems after investigating the vehicle lamp 100R in FIG. 1.

There may be a period during which all of the plurality of light emitting elements 302_1 to 302_N are turned off (complete lighting-off state) according to a light distribution pattern. It is possible to achieve a sufficiently long-time complete lighting-off state by stopping the constant current circuit 202R to set the lamp current $I_{LAMP}$ to zero.

However, in a situation where a short-time complete lighting-off state occurs repeatedly (for example, a situation where PWM control is performed on each bypass switch of the bypass circuit 280), the constant current circuit 202R cannot be stopped in the complete lighting-off state. This is because a delay occurs when the constant current circuit 202R is stabilized to an operating state from the stopped state and the lamp current $I_{LAMP}$ is not stabilized at the target current during the delay, so that the luminance of the light emitting elements become unstable. Therefore, it is necessary for the constant current circuit 202R to continue generating a constant lamp current $I_{LAMP}$ even in the complete lighting-off state.

In the complete lighting-off state, if the switching operation of the switching converter 204 is maintained, the same amount of lamp current $I_{REF}$ as that in a normal lighting-on state continues flowing into a switching transistor $M_1$ and the bypass switches SWB. Therefore, the lighting circuit 200R consumes electric power although the light source is turned off, which causes heat generation of the transistors configuring the bypass switches SWB. Furthermore, a transistor which is capable of withstanding heat is large in size and high in cost.

The present invention has been made in view of the above circumstances, and an aspect of the present invention provides a lighting circuit which is configured such that switching operation of a switching converter can be maintained which can reduce power consumption in a complete lighting-off state.

According to an aspect of the present invention, there is provided a lighting circuit configured to drive a light source including a plurality of light emitting elements connected in series. The lighting circuit includes a plurality of bypass switches respectively connected in parallel with the light emitting elements; a switching converter; and a converter controller configured to stabilize a lamp current generated by the switching converter to a first target amount in a lighting-on state where at least one of the plurality of light emitting elements is turned on, and to stabilize the lamp current to a second target amount smaller than the first target amount in a complete lighting-off state where all of the plurality of light emitting elements are turned off.

According to this configuration, since the current flowing into the plurality of bypass switches can be reduced in the complete lighting-off state, the heat generation can be reduced. Also, since heat generation amount is reduced, inexpensive parts which are small in size can be selected.

The converter controller may include a first controller configured to generate a first control pulse by a control method with a relatively high precision in the lighting-on state, a second controller configured to generate a second control pulse by a control method with a relatively low precision in a complete lighting-off state, and a driver circuit configured to drive the switching converter according to the first control pulse and the second control pulse.

The lighting circuit may further include a determination circuit which is configured to compare a voltage across the light source with a threshold voltage and determine that the light source is at the complete lighting-off state if the voltage across the light source is lower than the threshold voltage.

The lighting circuit may further include a bypass controller configured to control the plurality of bypass switches; and a determination circuit configured to detect the complete lighting-off state according to a control signal from the bypass controller.

According to another aspect of the present invention, there is provided a vehicle lamp. The vehicle lamp includes the light source which includes the plurality of light emitting elements connected in series; and the above-described lighting circuit configured to turn on the light source.

The vehicle lamp may further include a scanning optical system configured to receive light emitted from the light source and scan the front of the vehicle.

Incidentally, any combination of the above configuration elements, and the configuration elements and expressions substituted in methods, apparatus, systems, or the like are also effective as aspects of the present invention.

According to the above configuration, heat generation can be reduced in the complete lighting-off state.

DESCRIPTION OF EMBODIMENTS

Hereinafter, embodiments of the present invention will be described with reference to the drawings. Identical or equivalent components, members, and processes shown in each drawing are given with same reference numerals, and repeated descriptions are omitted appropriately. Also, the embodiments are not intended to limit the scope of the present invention and are merely for illustration, and all features described in the embodiments and combinations thereof are not necessarily essential features of the present invention.

In the specification, "a state where a member A is connected to a member B" includes not only a case where the member A and the member B are connected physically and directly, but also a case where the member A and the member B are connected indirectly via other members without causing substantial effects on an electrical connection state thereof or impairing functions or effects due to the connection thereof.

Similarly, "a state where a member C is provided between a member A and a member B" includes not only a case where the member A and the member C, or the member B and the member C, are connected directly, but also a case where the member A and the member C, or the member B and the member C, are connected indirectly via other members without causing substantial effects on an electrical connection thereof or impairing functions or effects due to the connection thereof.

Also, in the specification, reference numerals given to electrical signals such as voltage signals and current signals, or circuit elements such as resistors and capacitors represent voltage values and current values, or resistance values and capacitance values if necessary.

Figure 2:
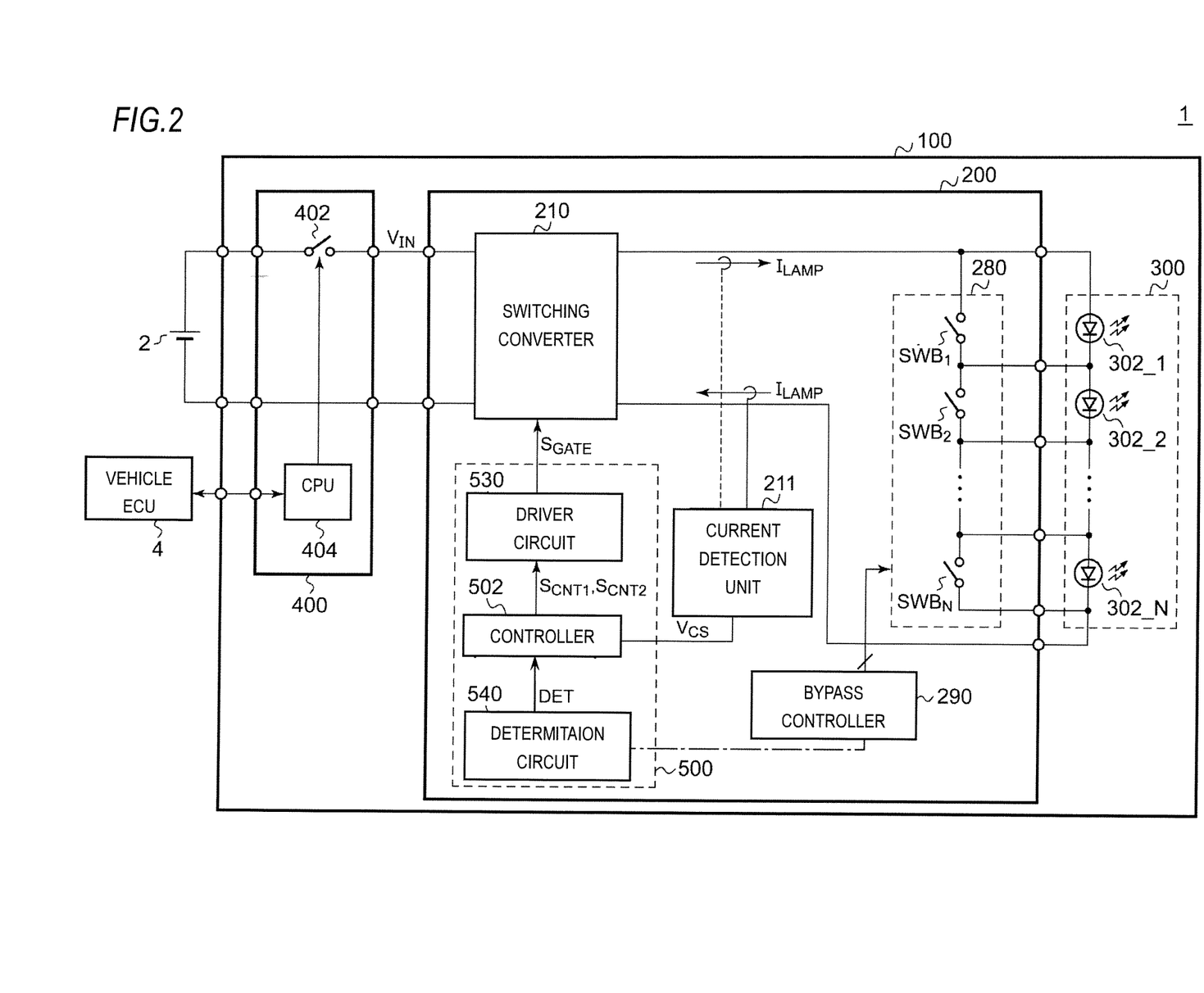
FIG. 2 is a block diagram of a lamp system including a vehicle lamp according to an embodiment of the present invention.

FIG. 2 is a block diagram of a lamp system 1 including a vehicle lamp 100 according to an embodiment of the present invention. The lamp system 1 includes a battery 2, a vehicle Electronic Control Unit (ECU) 4, and a vehicle lamp 100. The vehicle lamp 100 receives a direct current voltage (battery voltage) $V_{BAT}$ from the battery 2. The vehicle lamp 100 is connected to the vehicle ECU 4 via a Controller Area Network (CAN), a Local Interconnect Network (LIN), or the like.

The vehicle lamp 100 includes a lighting circuit 200, a light source 300, and a lamp Electronic Control Unit (ECU) 400. The lamp ECU 400 is connected with the vehicle ECU 4 and controls the lighting circuit 200 based on control signals or information from the vehicle ECU 4. In addition to instructions of turning-on/off, information indicating conditions of the vehicle or surroundings thereof is also transmitted from the vehicle ECU 4 to the lamp ECU 400. The information contains position information of a preceding vehicle and a pedestrian, a vehicle speed, or the like.

The lamp ECU 400 includes a switch 402 and a processor 404. The switch 402 is provided on a supply path of a power supply voltage from the battery 2 to the lighting circuit 200. The processor 404 is a Central Processing Unit (CPU) or a microcomputer, and controls the switch 402 based on turning-on/off instructions from the vehicle ECU 4. When the switch 402 is turned on in response to a turning-on instruction from a side of the vehicle, power is supplied to the lighting circuit 200. Based on the information from the vehicle ECU 4, the processor 404 determines a light distribution pattern and controls the lighting circuit 200.

The light source 300 includes a plurality of (N; N≥2) light emitting elements 302_1 to 302_N. The lighting circuit 200 is configured to independently control the turning on/off of the light source 300 by a bypass method.

The lighting circuit 200 includes a constant current circuit 202, a bypass circuit 280, and a bypass controller 290, which is similar to the lighting circuit 200R in FIG. 1. The bypass circuit 280 and the bypass controller 290 are similar to those in FIG. 1. The function of the bypass controller 290 may be implemented on the processor 404.

The constant current circuit 202 includes a switching converter 210 and a converter controller 500. The switching converter 210 is a buck converter, a boost converter, or a buck-boost Cuk converter.

The converter controller 500 controls the switching converter 210 such that a lamp current $I_{LAMP}$ approaches a target amount $I_{REF}$ thereof. Specifically, the converter controller 500 is configured to (i) stabilize a lamp current $I_{LAMP}$ generated by the switching converter 210 to a first target amount $I_{REF1}$ in a lighting-on state where at least one of the plurality of light emitting elements 302 is turned on, and to (ii) stabilize the lamp current $I_{LAMP}$ to a second target amount $I_{REF2}$ smaller than the first target amount $I_{REF1}$ in a complete lighting-off state where all of the plurality of light emitting elements 302 are turned off.

For example, on an output side of the switching converter 210, current detection unit 211 is provided to directly monitor the lamp current $I_{LAMP}$ and generate a first detection signal $V_{CS1}$ according to the lamp current $I_{LAMP}$. The current detection unit 211 may be a combination of the sense resistor $R_S$ and the current detection circuit 206 in FIG. 1. The current detection unit 211 may detect a lamp current $I_{LAMP}$ on an anode side (high side) of the light source 300, or may detect the lamp current $I_{LAMP}$ on a cathode side (low side) of the light source 300.

The converter controller 500 includes a controller 502, a driver circuit 530, and a determination circuit 540. The determination circuit 540 determines whether the light source is at the lighting-on state or at the complete lighting-off state and generates a determination signal DET indicating the determination result. For example, the determination signal DET is at a low level in the lighting-on state and is at a high level in the lighting-off state.

When the determination signal DET indicates the lighting-on state, the controller 502 generates a first control pulse $S_{CNT1}$ such that the lamp current $I_{LAMP}$ indicated by the first detection signal $V_{CS1}$ approaches the first current amount $I_{REF1}$. When the determination signal DET indicates the complete lighting-off state, the controller 502 generates a second control pulse $S_{CNT2}$ such that the lamp current $I_{LAMP}$ indicated by the first detection signal $V_{CS1}$ approaches the second current amount $I_{REF2}$. Based on the control pulses $S_{CNT1}/S_{CNT2}$ output from the controller 502, the driver circuit 530 generates a gate drive signal $S_{GATE}$ to drive the switching converter 210.

The configuration of the vehicle lamp 100 has been described above, and the operation thereof will be described below.

Figure 3:
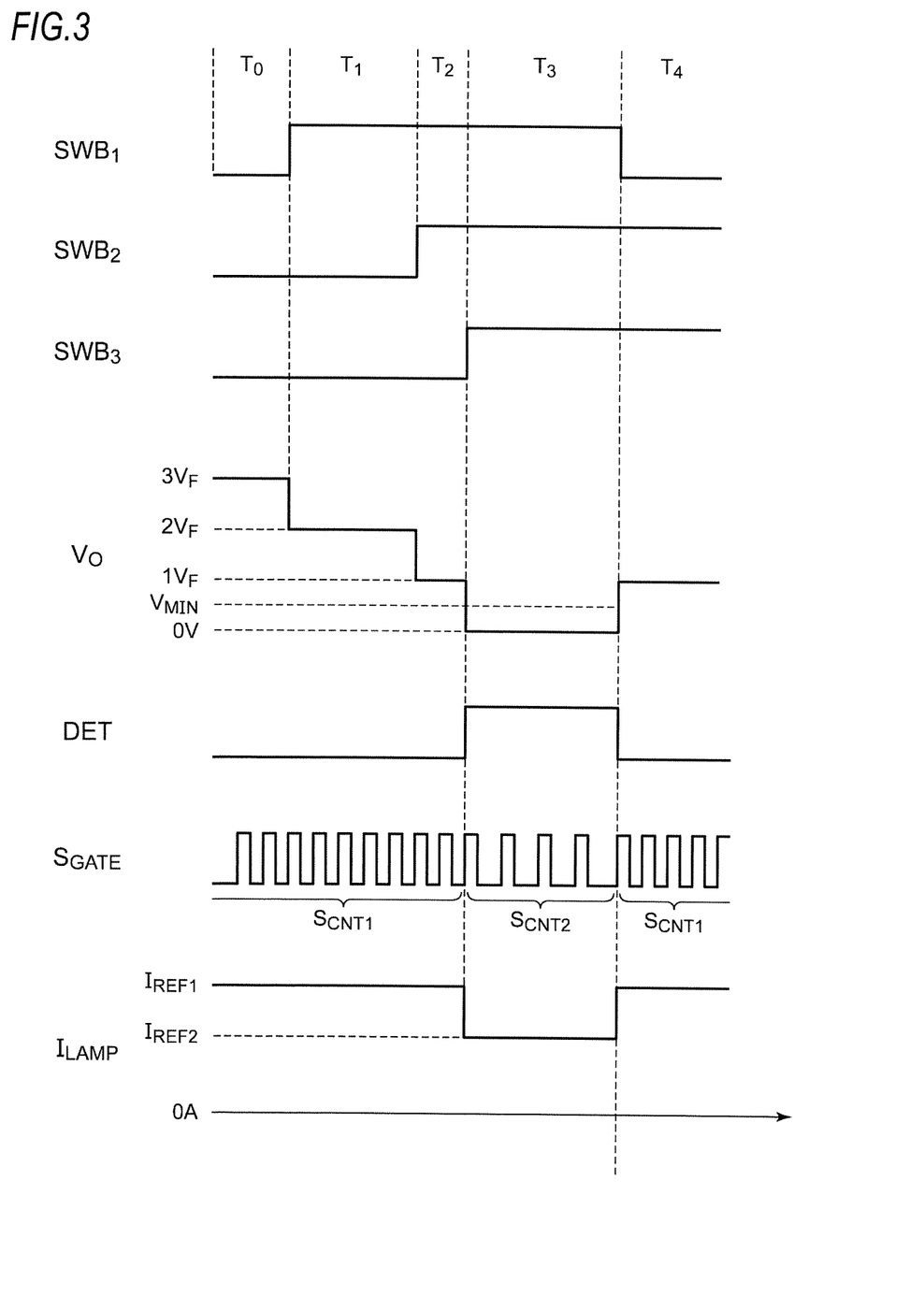
FIG. 3 is an operation waveform diagram of the vehicle lamp in FIG. 2.

FIG. 3 is an operation waveform diagram of the vehicle lamp 100 in FIG. 2. Here, N=3. In a period $T_0$, all of the bypass switches $SWB_1$ to $SWB_3$ are turned off, and all of the light-emitting elements 302_1 to 302_3 emit light. At this time, the output voltage $V_O$ of the switching converter 210 becomes $3 \times V_F$. $V_F$ is a forward voltage of the light emitting elements 302. Incidentally, the lamp current $I_{LAMP}$ is indicated by a straight line, but ripples may be included.

In a period $T_1$, the bypass switch $S_{WB1}$ is turned on, and the light-emitting element 302_1 is turned off. At this time, the output voltage $V_O$ of the switching converter 210 becomes $2 \times V_F$. In a period $T_2$, the bypass switches $S_{WB1}$ and $S_{WB2}$ are turned on, and the light-emitting elements 302_1 and 302_2 are turned off. At this time, the output voltage $V_O$ of the switching converter 210 becomes $1 \times V_F$.

In the periods $T_0$ to $T_2$, the light source is at the lighting-on state where at least one of the light emitting elements 302 is turned on, so that the determination signal DET is at a low level. Therefore, the switching converter 210 is driven according to a gate drive signal $S_{GATE}$ corresponding to the first control pulse $S_{CNT1}$, and the lamp current $I_{LAMP}$ is stabilized to the first target amount $I_{REF1}$.

In a period $T_3$, all of the bypass switches $SWB_1$ to $SWB_3$ are turned off and the light source is at the complete lighting-off state where all of the light-emitting elements 302_1 to 302_3 are turned off, so that the determination signal DET is at a high level. The switching converter 210 is driven according to a gate drive signal $S_{GATE}$ corresponding to the second control pulse $S_{CNT2}$, and the lamp current $I_{LAMP}$ is stabilized to the second target amount $I_{REF2}$.

In a subsequent period $T_4$, when the bypass switch $SWB_1$ is turned off, the output voltage $V_O$ becomes $1 \times V_F$. Then, the switching converter 210 is driven according to the first control pulse $S_{CNT1}$ and the lamp current $I_{LAMP}$ is stabilized to the first target amount $I_{REF1}$.

The operation of the vehicle lamp 100 has been described above, and the operation of the vehicle lamp 100 will be appreciated more clearly by comparing with the following comparative technique. In the comparative technique, the switching converter 210 is completely stopped and the lamp current $I_{LAMP}$ becomes zero in the complete lighting-off state $T_3$. Usually, since soft-start control is performed when the operation is resumed after the switching converter 210 is completely stopped, there is a long delay when the lamp current $I_{LAMP}$ returns to an initial target current.

On the contrary, according to the vehicle lamp 100 of the embodiment, even in the complete lighting-off state $T_3$, the switching operation of the switching converter 210 can be continued according to the second control pulse $S_{CNT2}$, and the lamp current $I_{LAMP}$ can be maintained to be non-zero. Thus, at a next time when the light emitting elements 302 are turned on, the light emitting elements 302 can be turned on quickly without soft-start control.

The lamp current $I_{LAMP}$ in the complete lighting-off state $T_3$ does not contribute to the light emission of the light emitting elements 302 and is wastefully consumed. Since the second target amount $I_{REF2}$ is set to be lower than the first target amount $I_{REF1}$, it is possible to reduce the power consumption in the bypass circuit 280, which in turn reduces the heat generation amount. This means that it is possible to select small and inexpensive parts having a smaller heat capacity as the bypass switches SWB.

The inventive concept of the present invention can be applied to various devices, circuits, and methods ascertained from the block diagram and the circuit diagram of FIG. 2 or derived from the above description, and is not limited to the specific configuration. Hereinafter, in order to facilitate understanding of an aspect of the invention and operation of the circuit and clarifying them, more specific embodiments and modifications will be described in detail, which is not intended to narrow the scope of the present invention.

Figure 4:
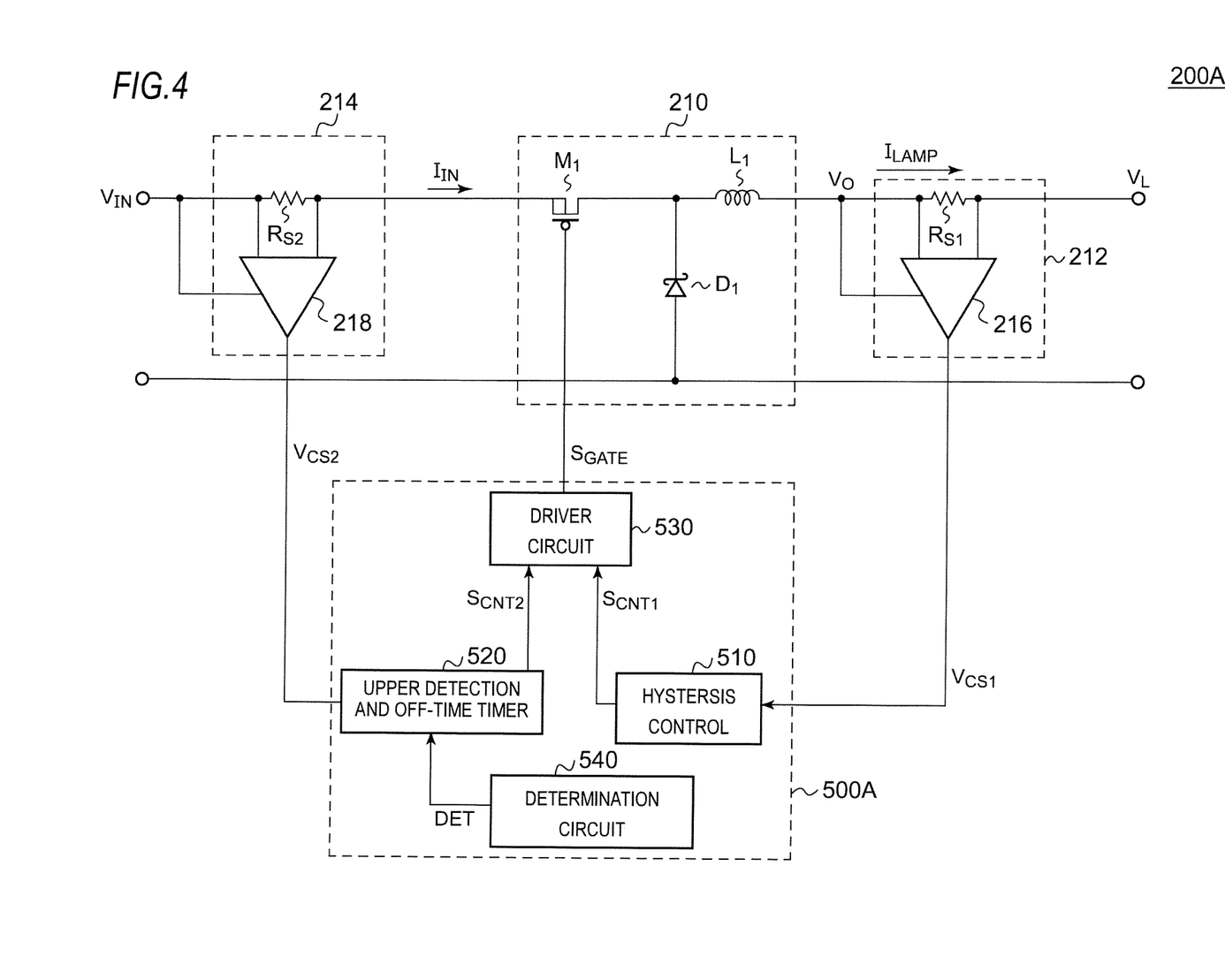
FIG. 4 is a block diagram of a lighting circuit according to an embodiment of the present invention.

FIG. 4 is a block diagram of a lighting circuit 200A according to an embodiment of the present invention. The switching converter 210 is a buck converter and includes a switching transistor $M_1$, an inductor $L_1$, and a rectifying element $D_1$. A first current detection unit 212 includes a first sense resistor $R_{S1}$ provided on a path of the lamp current $I_{LAMP}$, and a first current detection circuit 216 for converting a voltage drop of the first sense resistor $R_{S1}$ into a first detection signal $V_{CS1}$.

The converter controller 500A generates the first control pulse $S_{CNT1}$ based on the first detection signal $V_{CS1}$ generated by the first current detection unit 212 in the lighting-on state. In FIG. 4, the first sense resistor $R_{S1}$ is inserted on the anode side (high side) of the light source 300, and the power supply of the first current detection circuit 216 is from the output $V_O$ of the switching converter 210. Since a voltage $V_L$ across the light source 300 (the bypass circuit 280) substantially drops to zero in the complete lighting-off state, the output voltage $V_O$ of the switching converter 210 is also very low. As a result, the power supply voltage of the first current detection circuit 216 is insufficient, the detection signal $V_{CS1}$ related to the lamp current $I_{LAMP}$ cannot be generated, and the switching converter 210 cannot be controlled.

A second current detection unit 214 is provided separately from the first current detection unit 212 and is configured to generate a second detection signal $V_{CS2}$ indicating the lamp current $I_{LAMP}$ in the complete lighting-off state where the first current detection unit 212 is inoperable. It can be said that the second current detection unit 214 indirectly monitors the lamp current $I_{LAMP}$ by monitoring a current or voltage related to the lamp current $I_{LAMP}$. The second current detection unit 214 may be, for example, an input current of the switching converter 210, a coil current flowing into a coil of the switching converter 210, a current flowing into a switching element of the switching converter 210, or the like.

The converter controller 500A includes a first controller 510, a second controller 520, a driver circuit 530, and a determination circuit 540. The first controller 510 generates the first control pulse $S_{CNT1}$ based on the first detection signal $V_{CS1}$ generated by the first current detection unit 212. The first controller 510 controls at least one of a duty ratio, frequency, ON-time, and OFF-time of the first control pulse $S_{CNT1}$ such that the lamp current $I_{LAMP}$ approach the first target amount $I_{REF1}$.

In a case where the first current detection unit 212 is provided on an output side of the switching converter 210, as described with reference to FIG. 1, in the complete lighting-off state of the light source 300, the power supply voltage of the first current detection unit 212 is insufficient, the correlation between the first detection signal $V_{CS1}$ and the lamp current $I_{LAMP}$ is lost, so that the first controller 510 is inoperable.

In the complete lighting-off state, the second controller 520 generates a second control pulse $S_{CNT2}$ such that the lamp current $I_{LAMP}$ approaches the second current amount $I_{REF2}$. The second controller 520 may preferably generate the second control pulse $S_{CNT2}$ by feedback. Specifically, the second controller 520 controls at least one of a duty ratio, frequency, ON-time, and OFF-time of the second control pulse $S_{CNT2}$ based on the second detection signal $V_{CS2}$ generated by the second current detection unit 214 such that the lamp current $I_{LAMP}$ approaches the second target amount $I_{REF2}$.

The configurations of the first controller 510 and the second controller 520 and the pulse generation method are not particularly limited. For example, architectures of controllers of voltage mode, peak current mode, and average current mode may be adopted, and architectures of ripple control (hysteresis control, bottom detection and ON-time setting, upper detection and OFF-time setting) may also be adopted. Incidentally, in a case of controlling the light source 300 by the bypass method, since high-speed responsiveness is needed, the first controller 510 and the second controller 520 may preferably be ripple controllers. It should be noted that the second controller 520 may continue operating during a period in which the first controller 510 operates normally.

The lamp current $I_{LAMP}$ in the lighting-on state defines the luminance of the light source 300, and the lamp current $I_{LAMP}$ in the complete lighting-off state does not affect the luminance of the light source 300. Therefore, the first controller 510 is configured to generate the first control pulse $S_{CNT1}$ by a control method with a relatively high precision and the second controller 520 is configured to generate the second control pulse $S_{CNT2}$ by a control method with a relatively low precision.

The driver circuit 530 drives the switching converter 210 based on the first control pulse $S_{CNT1}$ and the second control pulse $S_{CNT2}$. The driver circuit 530 may select one of the first control pulse $S_{CNT1}$ and the second control pulse $S_{CNT2}$ to generate a gate drive signal $S_{GATE}$. Alternatively, the driver circuit 530 may also combine the first control pulse $S_{CNT1}$ and the second control pulse $S_{CNT2}$ to generate the gate drive signal $S_{GATE}$.

Next, a configuration example of a converter controller 500A will be described. The first controller 510 includes a controller of hysteresis control. Specifically, an upper threshold $I_{UPPER1}$ and a bottom threshold $I_{BOTTOM1}$ are defined in proximity to the first target amount $I_{REF1}$. The first controller 510 shifts the first control pulse $S_{CNT1}$ to an OFF level (for example, a low level) when the first detection signal $V_{CS1}$ reaches a voltage $V_{UPPER1}$ corresponding to the upper threshold $I_{UPPER1}$, and shifts the first control pulse $S_{CNT1}$ to an ON level (for example, a high level) when the first detection signal $V_{CS1}$ drops to a voltage $V_{BOTTOM1}$ corresponding to the bottom threshold $I_{BOTTOM1}$.

On an input side of the switching converter 210, the second current detection unit 214 is provided to monitor an input current $I_{IN}$ of the switching converter 210 and generate a second detection signal $V_{CS2}$ according to the lamp current $I_{LAMP}$. During a period when the switching transistor $M_1$ is turned on, the input current $I_{IN}$ is same as an output current $I_{LAMP}$. During a period when the switching transistor $M_1$ is turned off, the second detection signal $V_{CS2}$ has no correlation with the lamp current $I_{LAMP}$.

For example, the second current detection unit 214 includes a second sense resistor $R_{S2}$ provided on a path of the input current $I_{IN}$, and a second current detection circuit 218 for converting a voltage drop of the second sense resistor $R_{S2}$ into a second detection signal $V_{CS2}$. Incidentally, ON-resistance of the switching transistor $M_1$ may be used to replace the second sense resistor $R_{S2}$.

The power supply voltage of the second current detection circuit 218 may be an input voltage $V_{IN}$ of the lighting circuit 200A or an internal voltage obtained by stabilizing the input voltage $V_{IN}$. Therefore, it is possible to maintain operation of the second current detection circuit 218 even in the complete lighting-off state.

The second controller 520 may be a controller of upper detection and OFF-time setting mode. Specifically, the second controller 520 defines an upper threshold $I_{UPPER2}$ based on the second target amount $I_{REF2}$. The second controller 520 shifts the second control pulse $S_{CNT2}$ to an OFF level (for example, a low level) when the second detection signal $V_{CS2}$ reaches a voltage $V_{UPPER2}$ corresponding to the upper threshold $I_{UPPER2}$. Further, the second control pulse $S_{CNT2}$ is shifted to an ON level (for example, a high level) when a certain OFF-time $T_{OFF}$ has elapsed. The OFF-time $T_{OFF}$ may be constant or adjustable. According to the upper detection and OFF-time setting method, since current information during the period when the switching transistor $M_1$ is turned off is not needed, the second control pulse $S_{CNT2}$ can be generated based on the second detection signal $V_{CS2}$.

In the hysteresis control mode, an upper limit and a lower limit of the lamp current $I_{LAMP}$ are defined, whereas only an upper limit of the lamp current $I_{LAMP}$ is controlled in the upper detection and OFF-time setting mode. Therefore, it can be said that the current control precision of the first controller 510 is higher than that of the second controller 520.

The determination circuit 540 determines whether the light source is at the complete lighting-off state, and asserts the determination signal DET to activate the second controller 520 if the light source is at the complete lighting-off state.

Figure 5:
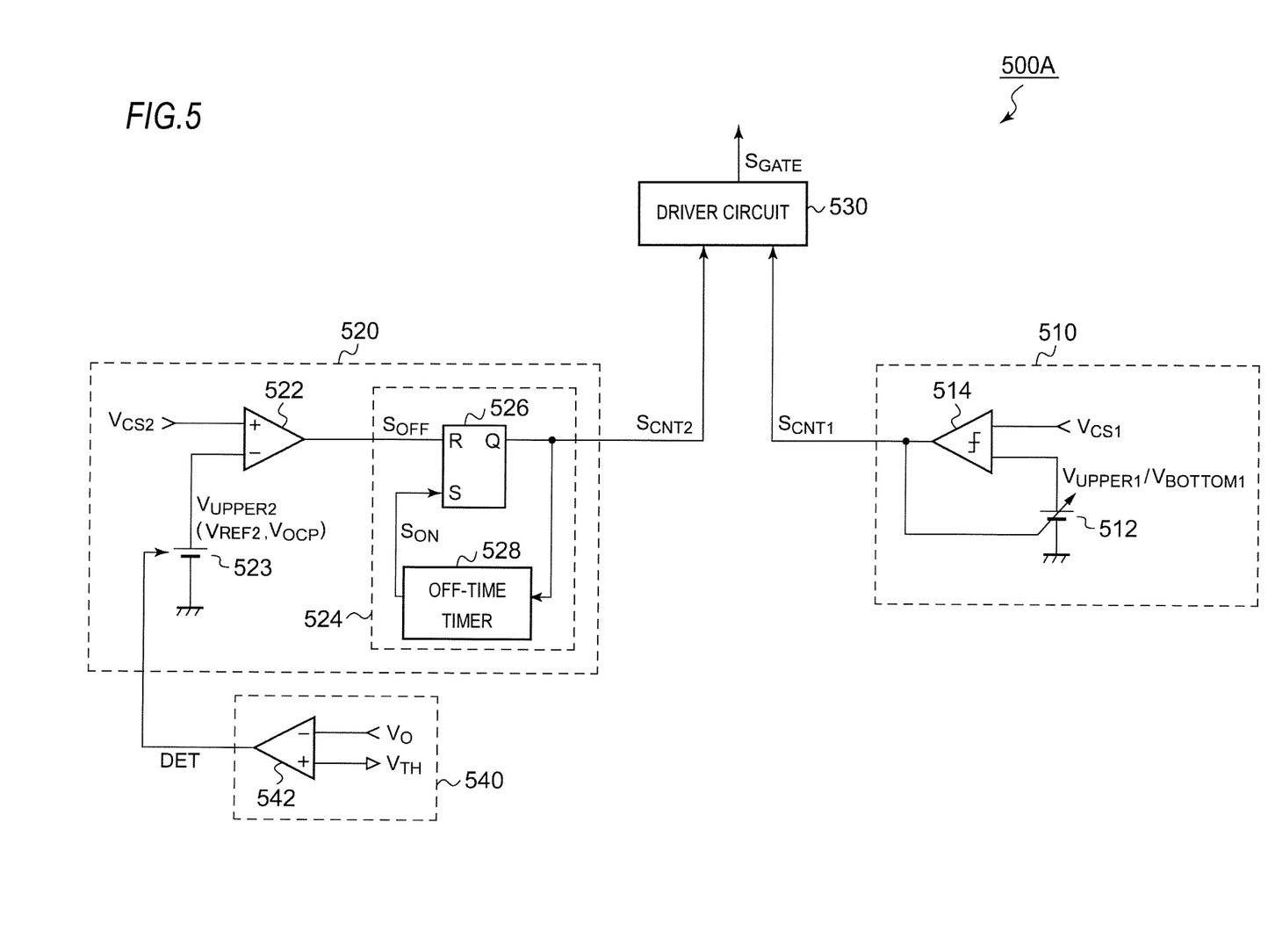
FIG. 5 is a diagram showing a specific configuration example of a converter controller.

FIG. 5 is a diagram showing a specific configuration example of the converter controller 500A. The first controller 510 includes a hysteresis comparator. The hysteresis comparator includes, for example, a variable voltage source 512 and a comparator 514. The variable voltage source 512 outputs one of the voltages $V_{UPPER1}$ and $V_{BOTTOM1}$ according to a state of the output (first control pulse $S_{CNT1}$) of the comparator 514. The comparator 514 compares the first detection signal $V_{CS1}$ with the output of the variable voltage source 512 and generates a first control pulse $S_{CNT1}$.

The second controller 520 includes a comparator 522 and a pulse generator 524. The comparator 522 compares the second detection signal $V_{CS2}$ with the voltage $V_{UPPER2}$ corresponding to the upper threshold $I_{UPPER2}$ and generates an OFF signal $S_{OFF}$ which is asserted (for example, a high level) when the second detection signal $V_{CS2}$ reaches the voltage $V_{UPPER2}$. The pulse generator 524 shifts to the OFF level in response to the assertion of the OFF signal, and thereafter generates a second control pulse $S_{CNT2}$ shifted to the ON level. The pulse generator 524 includes a flip-flop 526 and an OFF-time timer 528. The OFF signal $S_{OFF}$ is input to a reset terminal of the flip-flop 526. The OFF-time timer 528 asserts an ON signal $S_{ON}$ after the OFF-time $T_{OFF}$ has elapsed since the second control pulse $S_{CNT2}$ is shifted to the OFF level. The ON signal $S_{ON}$ is input to a set terminal of the flip-flop 526. Incidentally, the configuration of the flip-flop 526 is not limited to that shown in FIG. 5.

The determination circuit 540 may include a comparator 542 for comparing a voltage corresponding to the voltage across the light source 300 (load voltage $V_L$) with a predetermined threshold voltage $V_{TH}$. The determination circuit 540 may compare the output voltage $V_O$ of the switching converter 210 with the threshold voltage $V_{TH}$. The determination signal DET generated by the comparator 542 is asserted (high level) in the complete lighting-off state and is negated (low level) in the lighting-on state. By setting the threshold voltage $V_{TH}$ to be smaller than the forward voltage $V_F$ of the light emitting elements 302, it is possible to detect the complete lighting-off state based on $V_O<V_F$. Incidentally, the comparator 542 may also be used as a short-circuit detection circuit.

In a case where the second controller 520 is a controller of upper detection and OFF-time setting mode, the second controller 520 may be operated as an overcurrent protection circuit instead of being completely stopped in a period during which the first controller 510 is operable. In this case, the second upper threshold $I_{UPUPER2}$ may be replaced with a first value Inn and a second value $I_{TH2}$. Specifically, the upper threshold $I_{UPPER2}$ of the second controller 520 may be set to the first value $I_{TH1}$ corresponding to the second target amount $I_{REF2}$ in a state where the first controller 510 is inoperable. Also, the upper threshold $I_{UPPER2}$ may be set to the second value $I_{TH2}$, corresponding to an overcurrent threshold $I_{OCP}$ higher than the first target amount $I_{REF1}$ in a state where the first controller 510 is operable.

Specifically, when the determination signal DET is asserted, a voltage generated by a voltage source 523 may set to a first level $V_{REF2}$ corresponding to the second target amount $I_{REF2}$, and when the determination signal DET is negated, the voltage generated by the voltage source 523 may be set to a second level $V_{OCP}$ corresponding to the overcurrent threshold $I_{OCP}$.

Figure 6:
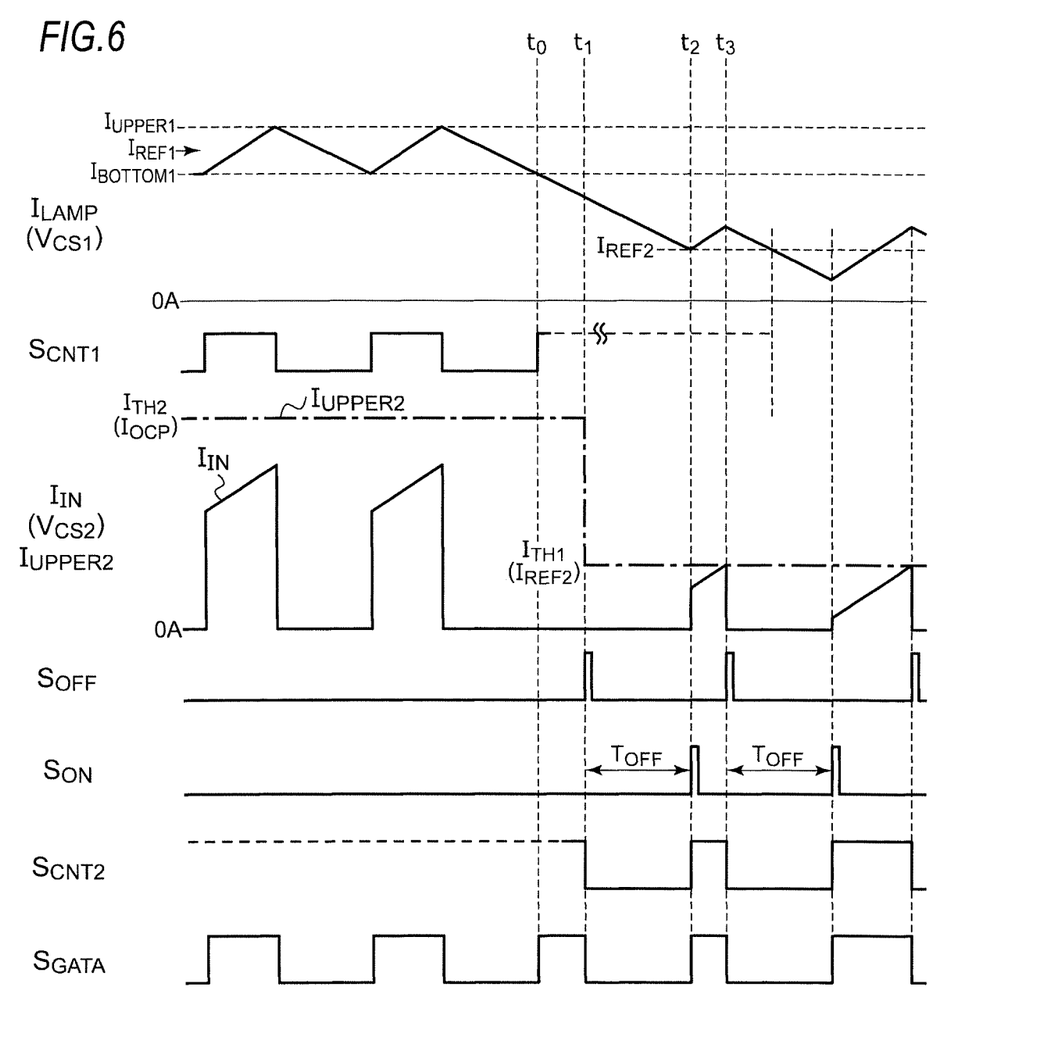
FIG. 6 is a diagram for illustrating overcurrent protection by a second controller.

FIG. 6 is a diagram for illustrating operation of the second controller 520. In a state where at least one of light emitting elements 302 is turned on (referred to as a lighting-on state), the determination signal DET is negated. Before a time $t_0$, the first controller 510 is operated normally and the switching transistor $M_1$ is controlled according to the first control pulse $S_{CNT1}$ generated by the first controller 510, so that the lamp current $I_{LAMP}$ is stabilized in a range of $I_{UPPER1}$ and $I_{BOTTOM1}$ corresponding to the first target amount $I_{REF1}$. When the first controller 510 is operated normally, the second controller 520 does not affect the control of the switching transistor $M_1$.

Before the time to, the value of the upper threshold $I_{UPPER2}$ of the second controller 520 is the second value $I_{TH2}$ corresponding to an overcurrent threshold $I_{OCP2}$. It is assumed that an abnormality occurs on the first controller 510 at the time $t_0$. In the abnormal state, the value of the upper threshold $I_{UPPER2}$ of the second controller 520 decreases to the first value $I_{TH1}$ defining the second target amount $I_{REF2}$.

At a time $t_1$, the OFF signal $S_{OFF}$ is asserted in the second controller 520. Then, the ON signal $S_{ON}$ is asserted at a time $t_2$ after a lapse of the OFF-time $T_{OFF}$, the second control pulse $S_{CNT2}$ and the gate drive signal $S_{GATE}$ are at the ON level, so that the switching transistor $M_1$ is turned on. When the switching transistor $M_1$ is turned on, the input current $I_{IN}$ increases and the second detection signal $V_{CS2}$ increases. Further, when $I_{IN}>I_{OCP}$ is satisfied, in other words, when $V_{CS2}>V_{OCP}$ is satisfied, the OFF signal $S_{OFF}$ is asserted in the second controller 520, the second control pulse $S_{CNT2}$ is shifted to the OFF level and the gate drive signal $S_{GATE}$ is at the OFF level, so that the switching transistor $M_1$ is turned off. Further, at a time $t_4$ after a lapse of the OFF-time $T_{OFF}$, the ON signal $S_{ON}$ is asserted, and the second control pulse $S_{CNT2}$ is shifted to the ON level.

Next, an embodiment in which the similar function to the lighting circuit 200A in FIG. 4 is implemented by using a commercially available LED driver Integrated Circuit (IC) will be described. Here, for example, LM3409 of TEXAS INSTRUMENTS INC. in the United States will be described as an example of an LED driver IC.

Figure 7:
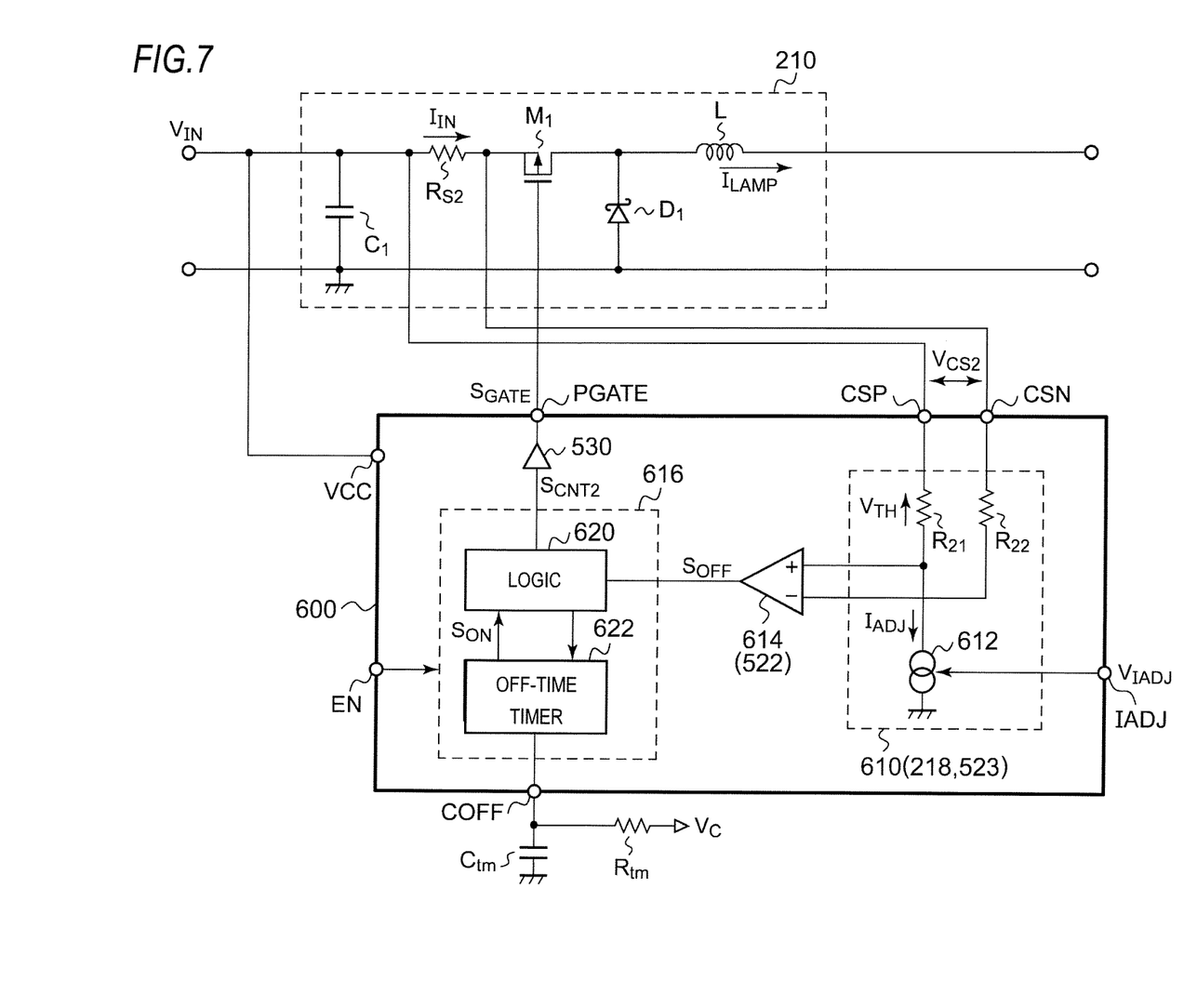
FIG. 7 is a simplified block diagram of a driver IC.

FIG. 7 is a simplified block diagram of a driver IC 600. It can be appreciated that the driver IC 600 integrates the driver circuit 530, the second controller 520, and the second current detection circuit 218 in FIG. 4.

The driver IC 600 incorporates a controller of upper detection and OFF-time setting method. In the present embodiment, the controller incorporated in the driver IC 600 is used as the second controller 520 (and overcurrent protection circuit) in FIG. 4.

A PGATE terminal of the driver IC 600 is connected to a gate of the switching transistor $M_1$. A current setting (IADJ) terminal is configured to set a peak current $I_{UPPER}$ used in the upper detection and OFF-time setting method. A CSP terminal and a CSN terminal for current detection are connected to the second sense resistor $R_{S2}$. A voltage $V_{CS2}$ proportional to the input current $I_{IN}$ is generated between the CSP terminal and the CSN terminal.

A level shifter 610 includes resistors $R_{21}$ and $R_{22}$, and a V/I conversion circuit 612. The V/I conversion circuit 612 generates a current $I_{ADJ}$ proportional to a voltage $V_{IADJ}$ input to the IADJ terminal. A voltage drop $I_{ADJ} \times R_{21}$ corresponding to the upper threshold $I_{UPPER2}$ is generated on the resistor $R_{21}$, and a voltage $V_{CSP}-I_{ADJ} \times R_{21}$ is generated on one end of the resistor $R_{21}$ at a low potential. A voltage drop of the resistor $R_{22}$ is substantially zero. The level shifter 610 corresponds to the second current detection circuit 218 and the voltage source 523 in FIG. 5.

The comparator 614 corresponds to the comparator 522 in FIG. 5. The comparator 614 compares a voltage on one end of the resistor $R_{21}$ with a voltage on one end of the resistor $R_{22}$ and generates an OFF signal $S_{OFF}$. That is, the comparator 614 compares $V_{CSP}-I_{ADJ} \times R_{21}$ with $V_{CSP}-R_{S2} \times I_{IN}$. This is equivalent to comparing between $I_{ADJ} \times R_{21}$ and $R_{S2} \times I_{IN}$. The OFF signal $S_{OFF}$ is asserted if $I_{IN} > I_{ADJ} \times R_{21}/R_{S2}$ is satisfied.

The $I_{ADJ}$ terminal of the driver IC 600 is a setting pin for setting the upper threshold $I_{UPPER2}$ (and $I_{OCP}$). A voltage $V_{IADJ}$ which has a level corresponding to the $I_{OCP}$ when the first controller 510 is operable, and has a level corresponding to $I_{UPPER2}$ when the first controller 510 is inoperable is input to the $I_{ADJ}$ terminal.

A capacitor for OFF-time setting is externally attached to a COFF terminal. A GND terminal is grounded. The input voltage $V_{IN}$ is supplied to a $V_{IN}$ terminal.

The pulse generator 616 includes a logic circuit 620 and an OFF-time timer circuit 622. When the output $S_{OFF}$ of the comparator 614 is asserted, the logic circuit 620 shifts the second control pulse Scrip to the OFF level and provides a start trigger for the OFF-time timer circuit 622. The logic circuit 620 is equivalent to the flip-flop 526 in FIG. 5, and the OFF-time timer circuit 622 is equivalent to the OFF-time timer 528 in FIG. 5.

The OFF-time timer circuit 622 starts to operate in response to the start trigger, and asserts an ON signal $S_{ON}$ after the lapse of the OFF-time $T_{OFF}$. For example, the OFF-time timer circuit 622 includes but not limited to a switch provided in parallel with the capacitor $C_{tm}$ which is externally attached between the COFF terminal and the ground, and a comparator which compares the voltage $V_{COFF}$ on the COFF terminal with a predetermined voltage $V_{OFF}$. Also, a charging voltage $V_C$ is applied to the COFF terminal via a resistor Rim. When $V_{COFF} > V_{OFF}$ is satisfied, the switch of the OFF-time timer circuit 622 is turned on and the capacitor $C_{tm}$ is discharged. It is possible to set the OFF-time according to a capacitance value of the capacitor $C_{tm}$, a charging voltage $V_C$, and a resistance value Rim. The logic circuit 620 shifts the second control pulse $S_{CNT2}$ to an ON level in response to the assertion of the ON signal $S_{ON}$.

An output of the driver circuit 530 is connected to the gate of the switching transistor $M_1$ via the PGATE terminal.

The driver IC 600 includes an enable (EN) terminal and is enabled when a high level is input to the enable terminal. During a time when a low level is input to the enable terminal, the driver IC 600 is disabled and the gate output PGATE is fixed at the low level, so that the switching transistor $M_1$ is turned off.

Figure 8:
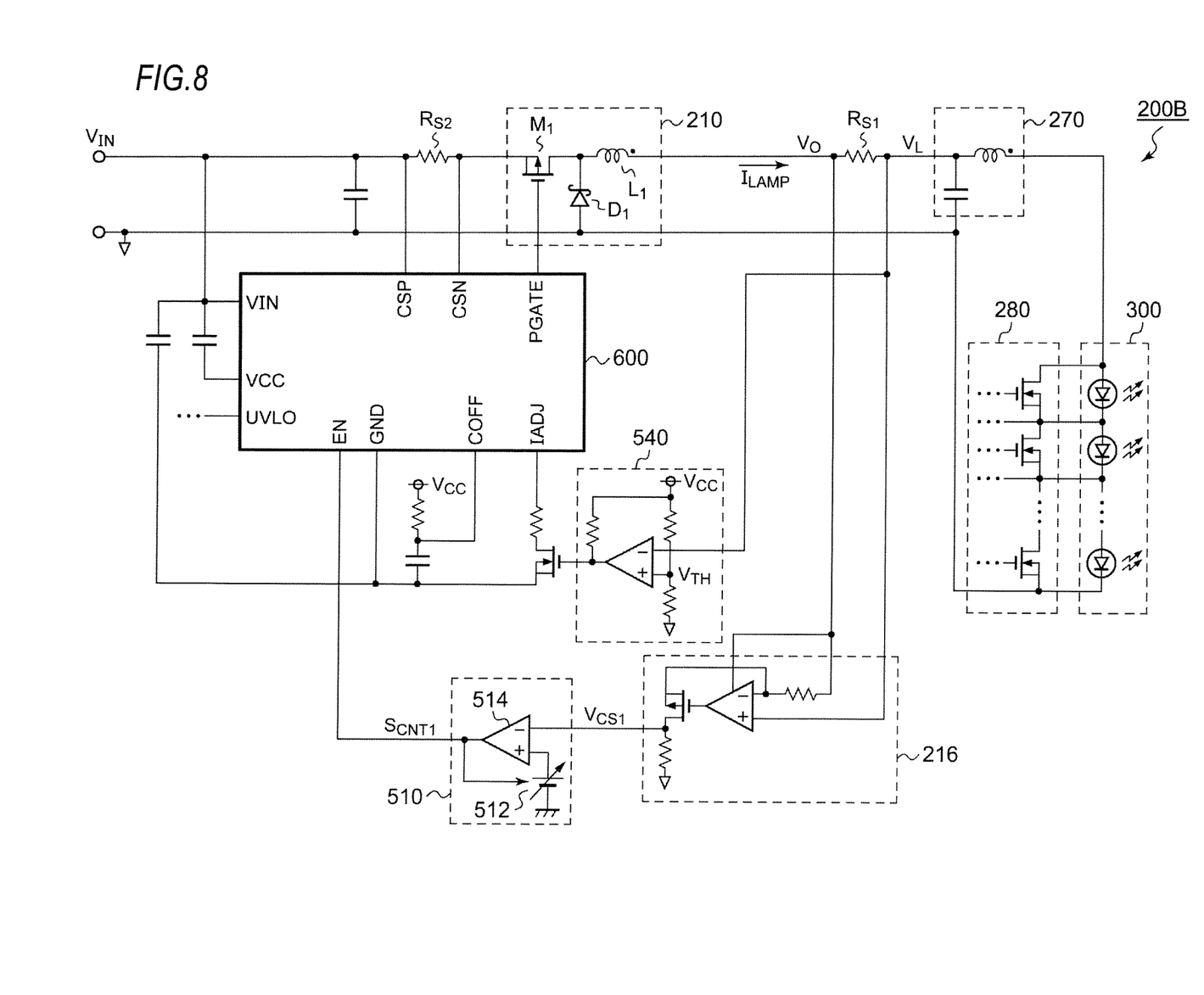
FIG. 8 is a circuit diagram of a lighting circuit including the driver IC in FIG. 7.

FIG. 8 is a circuit diagram of a lighting circuit 200B including the driver IC 600 in FIG. 7. The first control pulse $S_{CNT1}$ generated by the first controller 510 is input to the enable terminal of the driver IC 600. That is, the whole driver IC 600 is turned on/off according to the first control pulse $S_{CNT1}$, and thus a gate drive signal $S_{GATE}$ corresponding to the first control pulse $S_{CNT1}$ is generated on the PGATE terminal. When all the lights are turned off, the enable terminal EN is fixed at the high level, and a gate drive signal $S_{GATE}$ corresponding to the second control pulse $S_{CNT2}$ generated inside the driver IC 600 is generated on the PGATE terminal.

The determination circuit 540 compares the load voltage $V_L$ supplied to the light source 300 with the threshold voltage $V_{TH}$, and generates a determination signal DET. If the determination signal DET indicates a lighting-on state, a first voltage level is supplied to the $I_{ADJ}$ terminal, and thus an upper current inside the driver IC 600 is set to $I_{OCP}$ and the overcurrent protection function is activated. If the determination signal DET indicates a complete lighting-off state, a second voltage level is supplied to the $I_{ADJ}$ terminal, and thus the upper current inside the driver IC 600 is set to $I_{UPPER2}$ and the second control pulse $S_{CNT2}$ is generated according to the upper detection and OFF-time setting mode. That is, the second controller 520 is activated. Incidentally, a filter 270 for removing ripples may be inserted between the switching converter 210 and the light source 300.

Figure 9:
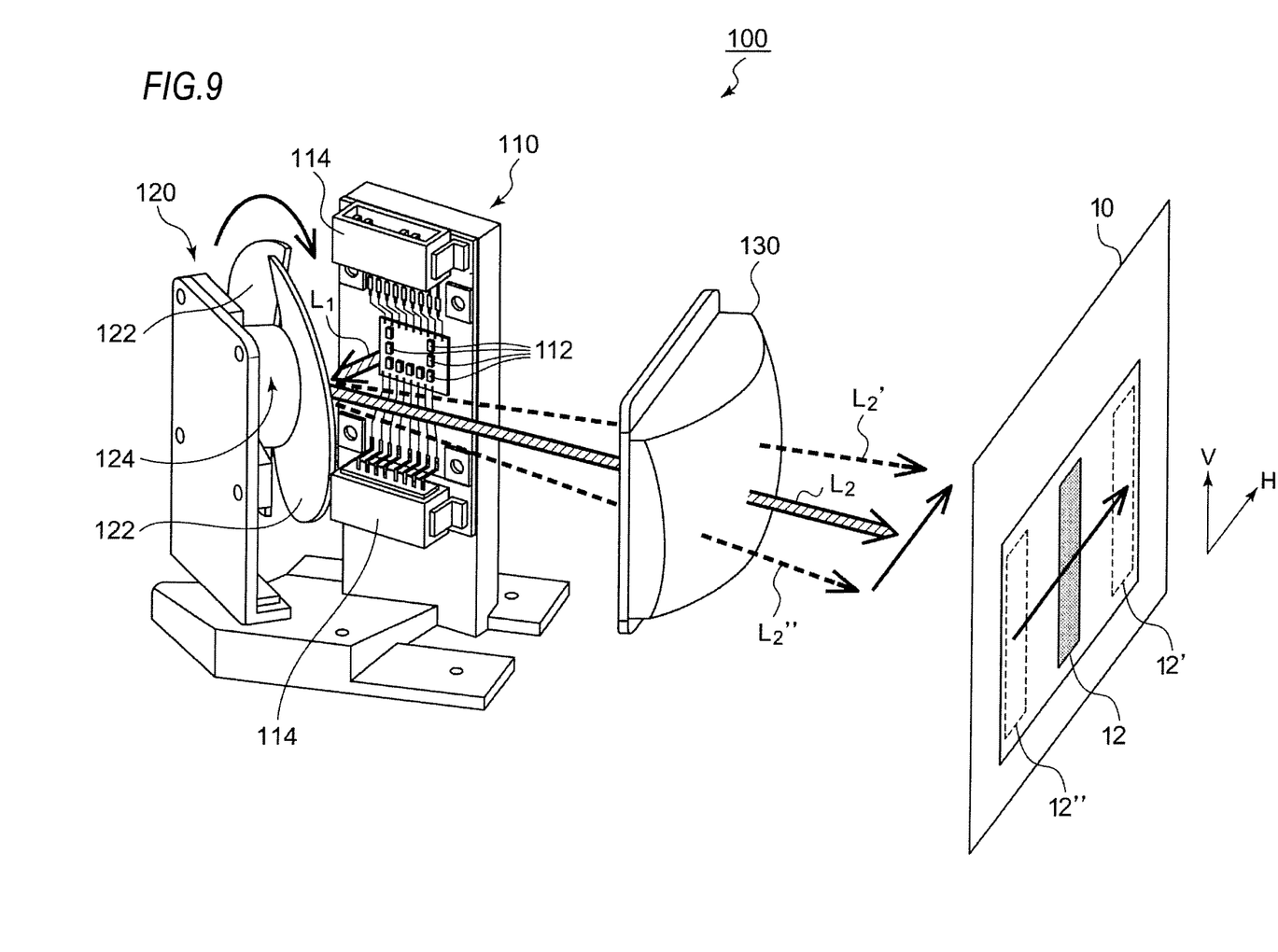
FIG. 9 is a perspective view of a vehicle lamp of scanning type.

The lighting circuit 200 can be mounted on vehicle lamps 100 of various types, and in particular preferably on a lamp of scanning type. FIG. 9 is a perspective view of a vehicle lamp of scanning type. The vehicle lamp 100 of FIG. 9 can select a plurality of light distribution modes according to traveling scenes.

The vehicle lamp 100 mainly includes a light source portion 110, a scanning optical system 120, a projection optical system 130, and the above-described lighting circuit 200. The light source portion 110 includes a plurality of light emitting units 112. The light source portion 110 and the light emitting units 112 correspond to the light source 300 and the light emitting elements 302 in FIG. 2. The plurality of light emitting units 112 are connected to the lighting circuit 200 (not shown) via a connector 114. The light emitting units 112 include semiconductor light sources such as light emitting diodes (LEDs) and laser diodes (LDs). One light emitting unit 112 configures a minimum control unit of luminance and turning-on/off. One light emitting unit 112 may be one LED chip (LD chip), or may include a plurality of LED chips (LD chips) connected in series and/or in parallel.

The scanning optical system 120 receives light $L_1$ emitted from the light source portion 110 and repeats a predetermined periodic motion, so that reflected light $L_2$ of the scanning optical system 120 scans a front area of the vehicle in a lateral direction (an H direction in the figure). The projection optical system 130 projects the reflected light $L_2$ of the scanning optical system 120 onto a virtual screen 10 at a front side of the vehicle. The projection optical system 130 may include a reflection optical system, a transmission optical system, or a combination thereof.

Specifically, the scanning optical system 120 includes a reflector 122 and a motor 124. The reflector 122 is attached to a rotor of the motor 124 and performs rotational motion. In the present embodiment, two reflectors 122 are provided, and the emitted light $L_2$ performs scanning twice per rotation of the motor 124. Therefore, a scanning frequency is twice a rotation speed of the motor. Incidentally, the number of reflectors 122 is not particularly limited.

At a certain time to, the light $L_1$ emitted from the light source portion 110 is reflected at an angle corresponding to a position of the reflector 122 (a rotation angle of the rotor), the reflected light $L_2$ at this time forms one irradiation region 12 on the virtual screen 10 at a front side of the vehicle. For simplification of description, the irradiation region 12 is shown in FIG. 9 to be rectangular, but the irradiation region 12 is not limited to be rectangular, which will be described later.

At another time $t_1$, when the position of the reflector 122 changes, a reflection angle changes, and reflected light L2' at that time forms an irradiation region 12'. Further, at another time $t_2$, when the position of the reflector 122 changes, the reflection angle changes, and reflected light $L_2''$ at that time forms an irradiation area 12''.

The irradiation region 12 performs scanning on the virtual screen 10 by rotating the scanning optical system 120 at a high speed, and therefore, light distribution patterns are formed at a front side of the vehicle.

Figure 10A:
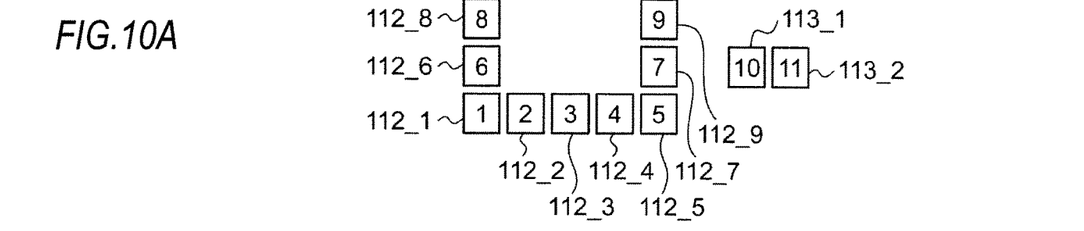
FIGS. 10A to 10D are diagrams for illustrating formation of light distribution patterns.

FIGS. 10A to 10D are diagrams for illustrating formation of light distribution patterns. FIG. 10A shows a layout of the plurality of light emitting units 112 in the light source portion 110. In the present embodiment, the number of the plurality of light emitting units 112 is nine.

The plurality of light emitting units 112 are arranged in two or more stages in the height direction and three stages in this example, and the number of the light emitting units 112 on the lowest stage is the largest. Therefore, it is possible to form a region with high illuminance in the vicinity of a line H on the virtual screen.

The vehicle lamp 100 according to the present embodiment forms the light distribution patterns by superposing light distribution based on scanning and light distribution based on non-scanning. In addition to the plurality of light emitting units 112_1 to 112_9 for scanning, the light source portion 110 includes at least one of the light emitting units 113_1 and 113_2 for widely irradiating a front area of the vehicle in a non-scanning manner. Light emitted from the light emitting units 113_1 and 113_2 is irradiated onto the virtual screen 10 via an optical system (not shown) different from the scanning optical system 120.

Figure 10B:
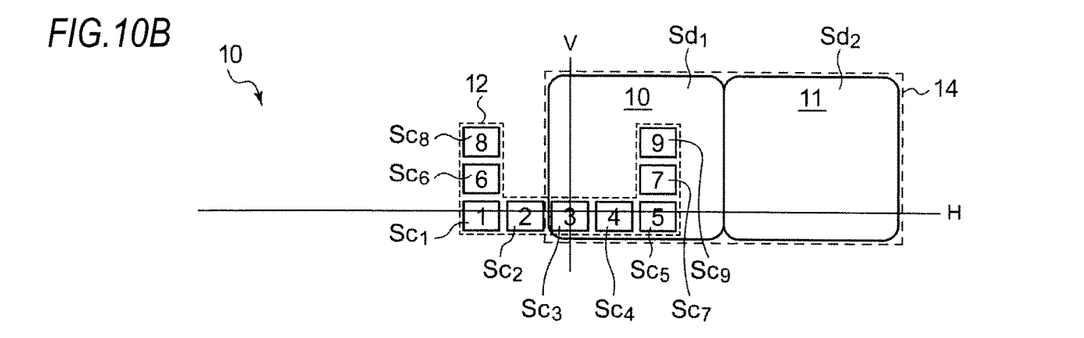

FIG. 10B is a diagram showing an irradiation spot formed by the light emitted from the light emitting units 112, 113 on the virtual screen 10 when the reflector 122 is at a predetermined position.

The irradiation spot formed by the light emitting units 112 for scanning is referred to as a focused spot Sc. $Sc_i$ represents a focused spot formed by an i-th lighting unit 112_i ($1 \leq i \leq 9$). A combination of a plurality of focused spots $Sc_1$ to $Sc_9$ in FIG. 10B corresponds to an irradiation region 12 in FIG. 9.

The irradiation spot formed by the light emitting units 113 for diffusion on the virtual screen 10 is referred to as a diffusion spot Sd. $Sd_i$ represents a diffusion spot formed by an i-th lighting unit 113_i. The diffusion spot Sd is irrelevant to the rotation of the reflector 122. A combination of the diffusion spots $Sd_1$ and $Sd_2$ is referred to as a diffusion region 14.

FIG. 10B only shows the irradiation spots Sc and Sd based on the right lamp. In a case where the right lamp and the left lamp are symmetrical, irradiation spots of the left lamp is formed by left-right inverting the irradiation spots of FIG. 10B along a line V.

Figure 10C:
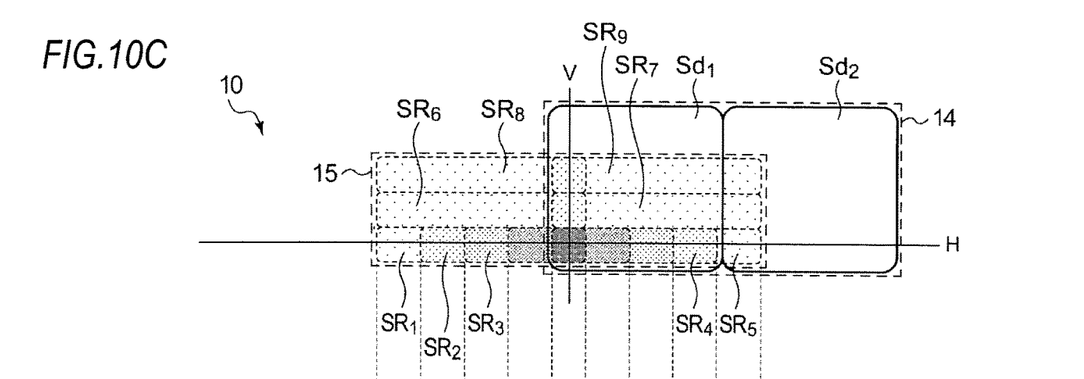

FIG. 10C shows regions SR (referred to as scanning regions) through which each focused spot Sc passes when the reflector 122 is rotated. $SR_i$ represents a region through which an i-th focused spot $Sc_i$ passes. A combination of the scanning regions $SR_1$ to $SR_9$, that is, the regions where irradiation region 12 scans are referred to as a focused region 15. The focused region 15 overlaps with the diffusion region 14.

Figure 10D:
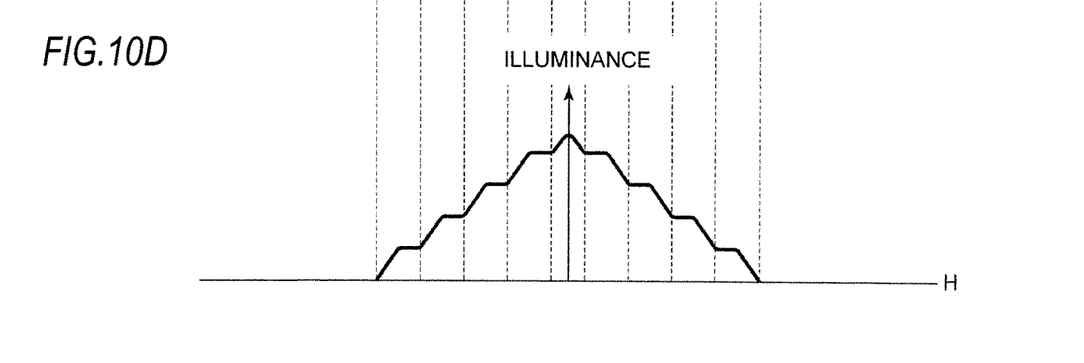

FIG. 10D shows illuminance distribution in a horizontal direction of the light distribution pattern in the vicinity of the line H which is formed by the light emitting units 112_1 to 112_5 on the lowest stage.

The actual light distribution pattern is a superposition of a light distribution pattern of the right lamp and a light distribution pattern of the left lamp. In this example, the focused region 15 of the left lamp substantially overlaps with the focused region 15 of the right lamp. The diffusion region 14 of the right lamp is mainly at a right side of the line V and the diffusion region 14 (not shown) of the left lamp is mainly at a left side of the line V.

Thus, the plurality of light emitting units 112_1 to 112_9 for scanning are arranged such that the emitted light separately irradiates different portions on the virtual screen. The plurality of light emitting units 112 may be arranged in a U shape as shown in FIG. 10A. It is possible to align left and right ends of the focused regions of the light emitting units 112 at the first, second and third stage by arranging the plurality of light emitting units 112 into a U shape (or an E shape in FIG. 10B).

The correspondence between the plurality of light emitting units 112 and channels is, for example, as follows:

a first channel $CH_1$=the light emitting units 112_1 and 112_2;

a second channel $CH_2$=the light emitting unit 112_3;

a third channel $CH_3$=the light emitting units 112_4 and 122_5;

a fourth channel $CH_4$=the light emitting units 112_6 and 122_7;

a fifth channel $CH_5$=the light emitting units 112_8 and 122_9; and the light emitting units 113_1 and 113_2 for the diffusion region are a sixth channel $CH_6$.

The plurality of light emitting units 112 are arranged in three stages in the height direction, and the light emitting units 112 irradiating a same height are classified into a same channel so as to supply same amount of drive current to the light emitting units 112 in the same channel. The plurality of light emitting units 112 included in a same channel are connected in series so as to form one light source 300. The lighting circuit 200 is provided in each channel to light on the light emitting units included in a corresponding channel.

In a lamp of scanning type, a complete lighting-off state where a plurality of light emitting units 112 in the same channel are turned off at the same time may intermittently occurs in a scanning period. Therefore, it is possible to reduce the power consumption with the driving of the above-described lighting circuit 200.

The present invention has been described based on the embodiment. It should be appreciated by those skilled in the art that this embodiment is merely an example, various modifications can be made to the combination of configuration elements and processing processes, and such modifications are also within the scope of the present invention. Hereinafter, such modifications will be described.

(First Modification)

Turning-on/off of the plurality of light emitting elements 302 are controlled by the bypass controller 290. Therefore, the bypass controller 290 controls when the complete lighting-off state occurs. The determination circuit 540 may determine whether the light source is at a complete lighting-off state or at a lighting-on state based on information from the bypass controller 290. The first modification is shown by a dot-and-dash line in FIG. 2. Alternatively, function of the determination circuit 540 may be implemented on the bypass controller 290.

(Second Modification)

In the embodiment, although the switching converter 210 is a buck converter, the switching converter 210 may also be a boost converter or a buck-boost converter.

(Third Modification)

In the embodiment, the second converter controller 520 generates the second control pulse $S_{CNT2}$ based on the detect detection signal $V_{CS2}$ from the second current detection unit 214. The present invention is not limited thereto. The second controller 520 may generate the second control pulse $S_{CNT2}$ in a completely open loop. In this case, although the level at which the lamp current $I_{LAMP}$ is stabilized depends on the input voltage, the second controller 520 can be simplified. For example, the second controller 520 may include an oscillator.

Although the present invention has been described with specific words and phrases based on the embodiments, the embodiments merely show an aspect of the principle and application of the present invention, and various of modifications and configuration changes may be made on the embodiments without departing from the spirit of the invention as defined in the claims.

The invention claimed is:

1. A lighting circuit configured to drive a light source including a plurality of light emitting elements connected in series, the lighting circuit comprising:
    a plurality of bypass switches respectively connected in parallel to the light emitting elements;
    a switching converter; and
    a converter controller configured to (i) stabilize a lamp current generated by the switching converter to a first target amount in a lighting-on state where at least one of the plurality of light emitting elements is turned on, and to (ii) stabilize the lamp current to a second target amount smaller than the first target amount in a complete lighting-off state where all of the plurality of light emitting elements are turned off,
    wherein the converter controller includes:
        a first controller configured to generate a first control pulse by a control method with a relatively high precision in the lighting-on state;
        a second controller configured to generate a second control pulse by a control method with a relatively low precision in the complete lighting-off state; and
        a driver circuit configured to drive the switching converter according to the first control pulse and the second control pulse.

2. The lighting circuit according to claim 1, further comprising:
    a determination circuit configured to compare a voltage across the light source with a threshold voltage and determine that the light source is at the complete lighting-off state if the voltage across the light source is lower than the threshold voltage.

3. The lighting circuit according to claim 1, further comprising:
    a bypass controller configured to control the plurality of bypass switches; and
    a determination circuit configured to detect the complete lighting-off state according to a control signal from the bypass controller.

4. A vehicle lamp comprising:
    a light source including a plurality of light emitting elements connect in series; and
    the lighting circuit according to claim 1 which is configured to turn on the light source.

5. The vehicle lamp according to claim 4, further comprising:
    a scanning optical system configured to receive light emitted from the light source and scan a front area of a vehicle.

6. A lighting circuit configured to drive a light source including a plurality of light emitting elements connected in series, the lighting circuit comprising:
    a plurality of bypass switches respectively connected in parallel to the light emitting elements;
    a switching converter;
    a converter controller configured to (i) stabilize a lamp current generated by the switching converter to a first target amount in a lighting-on state where at least one of the plurality of light emitting elements is turned on, and to (ii) stabilize the lamp current to a second target amount smaller than the first target amount in a complete lighting-off state where all of the plurality of light emitting elements are turned off; and
    a determination circuit configured to compare a voltage across the light source with a threshold voltage and determine that the light source is at the complete lighting-off state if the voltage across the light source is lower than the threshold voltage,
    wherein the converter controller is configured to stabilize the lamp current to the second target amount smaller than the first target amount when the determination circuit determines that the light source is at the complete lighting-off state.

7. A vehicle lamp comprising:
    a light source including a plurality of light emitting elements connect in series; and
    the lighting circuit according to claim 6 which is configured to turn on the light source.

8. The vehicle lamp according to claim 7, further comprising:
    a scanning optical system configured to receive light emitted from the light source and scan a front area of a vehicle.

9. The lighting circuit according to claim 6, further comprising:
    a bypass controller configured to control the plurality of bypass switches; and
    a determination circuit configured to detect the complete lighting-off state according to a control signal from the bypass controller.

* * * * *